(12) United States Patent
Shiomi et al.

(10) Patent No.: US 8,394,157 B2
(45) Date of Patent: Mar. 12, 2013

(54) FILTER FOR GAS GENERATOR

(75) Inventors: Kazumitsu Shiomi, Tokyo (JP); Chiharu Shiomi, legal representative, Tokyo (JP); Yuka Shiomi, legal representative, Tokyo (JP); Chika Shiomi, legal representative, Tokyo (JP); Kazuya Koyama, Tochigi (JP); Naoki Matsuda, Hyogo (JP); Eiichi Ryobo, Hyogo (JP); Masayuki Yamazaki, Hyogo (JP)

(73) Assignees: Daicel Chemical Industries, Ltd., Osaka (JP); Fuji Filter Manufacturing Co., Ltd., Tokyo (JP)

( * ) Notice: Subject to any disclaimer, the term of this patent is extended or adjusted under 35 U.S.C. 154(b) by 1418 days.

(21) Appl. No.: 10/583,999

(22) PCT Filed: Jun. 1, 2005

(86) PCT No.: PCT/JP2005/000326
§ 371 (c)(1),
(2), (4) Date: Jun. 22, 2006

(87) PCT Pub. No.: WO2005/065811
PCT Pub. Date: Jul. 21, 2005

(65) Prior Publication Data
US 2010/0096843 A1    Apr. 22, 2010

(30) Foreign Application Priority Data
Jan. 7, 2004    (JP) .................. 2004-001592

(51) Int. Cl.
*B01D 39/20* (2006.01)
*B01D 46/00* (2006.01)

(52) U.S. Cl. ........ 55/385.3; 55/524; 55/525; 55/DIG. 5; 55/DIG. 43; 422/167; 280/736; 280/740; 280/743.1

(58) Field of Classification Search .................. 280/741, 280/736, 740, 728.1–743.1; 55/385.3, 524–525; 422/164–167; 141/14–17, 59, 58, 98; 166/227–236; 102/202, 202.5–202.14, 204, 282, 430, 530–531, 102/530–53; 264/DIG. 48, 234–237; 222/3, 222/5; 149/2–16
See application file for complete search history.

(56) References Cited

U.S. PATENT DOCUMENTS

| 3,690,606 A | * | 9/1972 | Pall ............................. 428/605 |
| 3,796,288 A | | 3/1974 | Pall |

(Continued)

FOREIGN PATENT DOCUMENTS

| GB | 1 419 780 A | 12/1975 |
| JP | 5-23511 A | 2/1993 |

(Continued)

OTHER PUBLICATIONS

English translation in part of JP 11-348712 A published on Dec. 21, 1999.

(Continued)

*Primary Examiner* — Duane Smith
*Assistant Examiner* — Thomas McKenzie
(74) *Attorney, Agent, or Firm* — Birch, Stewart, Kolasch & Birch, LLP

(57) ABSTRACT

A method of manufacturing a filter for a gas generator, by which a filter having a good shape retaining property can be obtained, is provided. A method of manufacturing a filter for a gas generator in which a tubular material is formed by knitting copper-plated iron wires, molten plated copper is adhered to an intersecting portion of the iron wire to fix the intersecting portion, wherein the method comprises a molding step for producing a tubular material by knitting the copper-plated iron wires, and a heat processing step in which the above tubular material is kept at a temperature not less than a melting point of copper but less than the temperature of sintering of the iron, and is then cooled.

6 Claims, 2 Drawing Sheets

U.S. PATENT DOCUMENTS

| | | | |
|---|---|---|---|
| 4,858,691 A * | 8/1989 | Ilfrey et al. | 166/278 |
| 5,407,120 A * | 4/1995 | Philpot | 228/155 |
| 5,547,638 A * | 8/1996 | Rink et al. | 422/164 |
| 5,613,705 A * | 3/1997 | Hock et al. | 280/741 |
| 5,645,296 A * | 7/1997 | Okada et al. | 280/736 |
| 5,779,267 A * | 7/1998 | Jordan et al. | 280/740 |
| 5,849,054 A | 12/1998 | Fujisawa | |
| 6,123,359 A * | 9/2000 | Cabrera et al. | 280/741 |
| 6,626,461 B2 * | 9/2003 | Koga et al. | 280/736 |
| 7,172,214 B2 * | 2/2007 | Matsuda et al. | 280/741 |
| 7,452,397 B2 * | 11/2008 | Hirata | 55/525 |
| 7,578,522 B2 * | 8/2009 | Hanano et al. | 280/740 |
| 2002/0017777 A1 * | 2/2002 | Katsuda et al. | 280/736 |
| 2003/0132623 A1 * | 7/2003 | Iwai et al. | 280/736 |
| 2004/0061319 A1 * | 4/2004 | Saso et al. | 280/741 |
| 2004/0075258 A1 * | 4/2004 | Kubo et al. | 280/735 |
| 2004/0207188 A1 * | 10/2004 | Matsuda et al. | 280/741 |
| 2006/0088456 A1 * | 4/2006 | Hanano et al. | 422/198 |
| 2006/0151978 A1 * | 7/2006 | Miyaji et al. | 280/736 |
| 2006/0157961 A1 * | 7/2006 | Burns | 280/736 |
| 2007/0193235 A1 * | 8/2007 | Hirata | 55/487 |
| 2011/0181030 A1 * | 7/2011 | Burns | 280/741 |

FOREIGN PATENT DOCUMENTS

| | | | |
|---|---|---|---|
| JP | 7-285412 A | | 10/1995 |
| JP | 7-285413 A | | 10/1995 |
| JP | 10-181516 A | | 7/1998 |
| JP | 11-5007 A | | 1/1999 |
| JP | 2926040 B2 | | 5/1999 |
| JP | 11-348712 A | | 12/1999 |
| JP | 2000-127888 A | | 5/2000 |
| JP | 2000-342915 A | | 12/2000 |
| JP | 2001-97172 A | | 4/2001 |
| JP | 2001-97175 A | | 4/2001 |
| JP | 2001-171472 A | | 6/2001 |
| JP | 2001171472 A | * | 6/2001 |
| JP | 2001-301561 A | | 10/2001 |
| WO | WO-00/48868 A1 | | 8/2000 |

OTHER PUBLICATIONS

English translation in part of JP 2000-342915 A published on Dec. 12, 2000.

English translation in part of JP 2001-171472 A published on Jun. 26, 2001.

English translation in part of JP 2001-301561 A published on Oct. 31, 2001.

* cited by examiner (a)

(b)

FILTER FOR GAS GENERATOR

TECHNICAL FIELD

The present invention relates to a filter for a gas generator used in a gas generator for an air bag, the method of manufacture thereof, and a gas generator for an air bag.

PRIOR ARTS

In pyrotechnic gas generators in which a combustion gas produced by a gas generating agent is used as a medium for inflating an air bag, a coolant/filter is used to cool the combustion gas and to capture the combustion residue. Known coolant/filters thereof include filters formed by the knitting a metal wire and filters formed by laminating wire mesh.

As prior art relating to the present invention, JP-A No. 11-348712 and JP-A No. 2000-342915 can be mentioned.

DISCLOSURE OF THE INVENTION

Because proper actuation of a gas generator for an air bag is required for a period equivalent to the number of years of the life of an automobile (at least 10 years), the coolant/filter, which constitutes a component part thereof, is demanded to be highly durable with respect to vibration (shape retaining property that ensures the same shape is maintained for the period of the life of an automobile) for a long period.

Accordingly, because the strength and durability of a coolant/filter manufactured by knitting a metal wire is inadequate, its strength is increased by means of a sintering process as described in JP-A No. 11-348712.

However, since the metal wire used for the coolant/filter is an iron wire or stainless steel wire, the sintering temperature, for example, in the sintering of iron (whose melting point is 1535° C.) is very high. For this reason, a quantity of consumed energy is increased and a time required to perform the sintering is long whereby, to that extent, the manufacturing cost is increased.

A purpose of the present invention provides a filter for a gas generator of a quality equal to or better than the conventional products, and a method of manufacturing a filter for a gas generator that facilitates the production of a high quality coolant/filter under more relaxed conditions.

In addition, another purpose of the present invention provides a gas generator for an air bag employing the filter for a gas generator.

The invention provides, as a means for solving the problem, a filter for a gas generator, comprising a tubular material formed by knitting a coated metal wire in which a metal wire corresponding to a core wire is coated with a lower melting point metal, wherein the lower melting point metal is a metal having a melting point lower than the metal of the core wire, and the intersecting parts of the coated metal wires are bonded by the affixing and solidifying of the molten lower melting point metal.

A melting point of the lower melting point metal for coating the metal wire of the core wire is preferably 20° C. or more lower than a melting point of the metal of the core wire, and more preferably 30° C. or more lower.

The metal wire of the core wire is preferably selected between iron wire and stainless steel wire, and the lower melting point metal for coating the core wire is preferably selected among copper, zinc, aluminium, tin or lead.

Further, invention provides, as another means for solving the problem, a method of manufacturing the above filter for a gas generator, comprising a molding step for producing a tubular material in which the metal wire corresponding to the core wire is coated with a lower melting point metal, and the coated metal wire, in which the lower melting point metal is a metal having a melting point lower than the metal of the core wire, is knitted, and also comprising a heat processing step in which the above tubular material is kept at a temperature not less than a melting point of the lower melting point metal for coating the core wire but less than the sintering temperature of the metal of the core wire, and is then cooled.

The tubular material in the molding step preferably has an inner diameter of 3 to 80 mm, an outer diameter of 10 to 90 mm, a height of 5 to 300 mm, and a mass of 10 to 400 g.

In the heat processing step, the heat processing is preferably performed at a temperature that is 10° C. or more higher than a melting point of the lower melting point metal that coats the core wire (and more preferably a temperature of 30° C. or more), but at a temperature of 10° C. or more lower than a melting point of the metal of the core wire (and more preferably a temperature of 50° C. or more lower).

The "filter" of the present invention refers to a component part that has a function for cooling a combustion gas and/or a function for arresting combustion residues.

Any metal wire is used as the "coated metal wire" of the present invention, as long as the core wire surface thereof is covered by a lower melting point metal, for example, a coated wire metal in which the core wire has been metal plated.

It should be noted that the melting points referred to in the present invention are based on the description in Chemical Dictionary, Volume 1, 1st Edition, Published on 20 Oct. 1989, Tokyo Kagaku Dojin Co., Ltd.

Further, invention provides, as another means for solving the problem, the present invention provides a gas generator for an air bag comprising a housing having a gas discharge port, an ignition means actuated by the impact, a combustion chamber storing a gas generating agent which is ignited and burned by the ignition means to generates a combustion gas, and a filter for filtering and cooling a combustion gas, wherein the above filter for a gas generator is used as a filter.

In the filter for a gas generator obtained by the manufacturing method according to the present invention, since the intersecting parts of the knitted coated metal wire are affixed as a result of the solidification of a molten lower melting point metal, and therefore, the filter has a good overall shape retaining property.

In addition, the filter for a gas generator of the present invention has a good shape retaining property for a long period, the reliability of the gas generator for an air bag in which the above filter is employed is improved.

BRIEF DESCRIPTION OF THE DIAGRAMS

EMBODIMENT OF THE INVENTION

Figure 1:
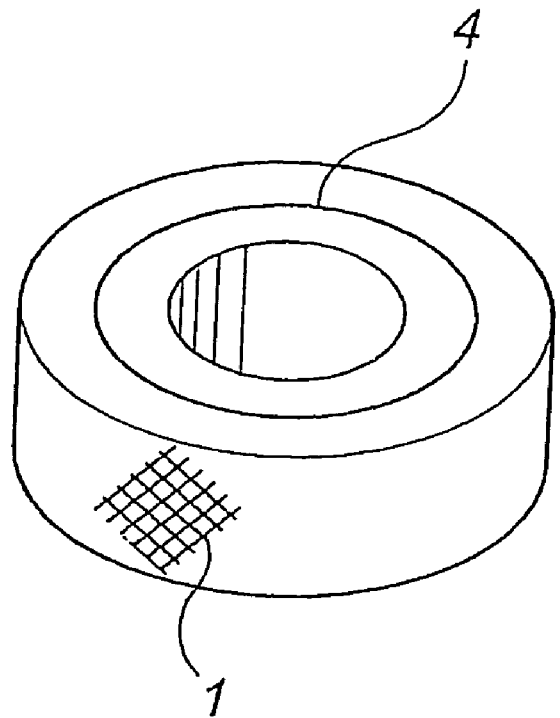
FIG. 1 is a conceptual diagram for explaining the tubular material in the manufacturing step or the exterior form of the gas generator as a final product.

A method of manufacture for producing the filter for a gas generator of the present invention will be described, and in the following embodiment, a copper-plated iron wire is employed. FIG. 1 is a conceptual diagram for explaining the tubular material in the manufacturing step or the exterior form of a filter for a gas generator as a final product.

First, in the molding step, a copper-plated iron wire 1 is knitted to produce the tubular material as shown in FIG. 1. One or two or more of copper-plated iron wire can be used. It should be noted that the copper that constitutes the plating metal refers to copper and an alloy of which the principle component is copper.

The dimensions used for any well-known filter for a gas generator can be adopted as the dimensions of the copper-plated iron wire. For example, the cross-sectional area can be selected within the range of 0.03 to 0.8 mm$^2$.

From the viewpoint of increasing the fixing strength of intersecting parts of the iron wire and increasing a shape retaining property of the filter as a whole, a thickness of the copper-plated layer is preferably 0.5 to 10 µm, and more preferably 1 to 3 µm. In addition, if a thickness of the copper-plated layer (that is, a quantity of coated copper) is within the abovementioned range, this is a sufficient quantity for the action of moving and affixing the molten copper to the intersecting parts of the iron wire, but no resultant dripping of the molten copper to block the filter gaps occurs.

The plated metal wire of the filter for a gas generator for an automobile air bag disclosed in JP-A No. 2000-342915 can be used as the copper-plated iron wire of the present invention.

Although there are no particular restrictions to the method for the knitting of the tubular material, a method in which a cylindrical core material is used to knit a copper-plated iron wire or the like on the perimeter thereof may be adopted. The outer diameter of this cylindrical core material is equivalent to the inner diameter of the tubular material produced in the molding step.

Although there are no particular restrictions to the method of knitting, hosiery knitting, winding, plain weaving, twilled weaving, plain Dutch weaving and twilled Dutch weaving are preferred.

An example of a method of cylindrically knitting a copper-plated iron wire such as the above is the method described in the paragraphs [0013] to [0016] of JP-A No. 2001-171472.

Although the dimensions of the tubular material produced in the molding step are determined in accordance with a type of a target gas generator, they can be selected within the range of 3 to 80 mm of an inner diameter, 10 to 90 mm of an outer diameter, 5 to 300 mm of a height and 10 to 400 g of a mass.

The tubular material produced in this way has an innumerable number of intersecting parts formed as a result of the intersecting netted iron wires produced by knitting one or two or more copper-plated iron wires into multi-layers.

Figure 2:
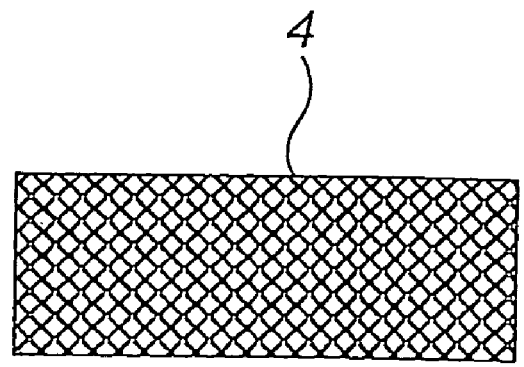
FIG. 2 is a conceptual diagram of another aspect of the filter for a gas generator shown in FIG. 1.

It should be noted that the mesh member (wire screen) 4 shown in FIG. 2 that functions as a filter material may be assembled with the filter, as shown in FIG. 1.

Next, in a heat processing step, the tubular material produced in the molding step is kept at a temperature not less than a melting point of copper but less than the temperature of sintering of the iron, and is then cooled. This heat processing can be performed when a core material is employed in the molding step, or the heat processing may also be performed after the core material is removed.

The lower limit temperature of the heat processing is preferably a temperature that is 10° C. or more higher than a melting point of the copper (1083° C.), and more preferably a temperature that is 30° C. or more higher.

The upper limit of the heat processing is preferably a temperature that is 10° C. or more lower than a melting point of the iron (1535° C.) that forms the core wire, and more preferably 50° C. or more lower. Because the heat processing is performed at a temperature lower than the temperature of sintering of the iron that forms the core wire in this way, compared to a method of heat processing performed at the temperature of sintering of iron, the quantity of energy consumed is reduced.

When the tubular material of the above dimensions and shape is heat-processed in the above range of temperature, the heat processing time is preferably 10 to 120 minutes.

After heat processing, the system is cooled to room temperature. Thereafter, if required, a molding means such as compression molding may be applied.

Figure 3:
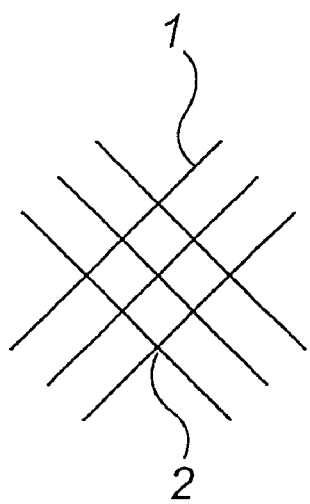
FIG. 3(a) is a conceptual diagram for explaining the state of the metal wire after the molding step.
FIG. 3(b) is a conceptual diagram for explaining the state of the metal wire after the heat processing step.
Figure 3:
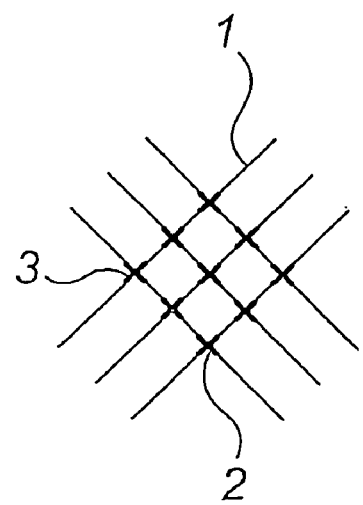

As is described above, the tubular material produced in the molding step includes, as shown in FIG. 3(a) (partial conceptual diagram of the tubular material), an innumerable number of intersecting parts 2 formed by intersecting the copper-plated iron wires 1.

By heat-processing this tubular material at the prescribed temperature conditions in the heat processing step, no change in the iron wire that is the core wire occurs, and all or part only, of the plated copper can be melted. As a result, as shown in FIG. 3(b), the molten copper 3 infiltrates gaps of the above intersecting parts 2 and adheres to the surface of the intersecting parts. At this time, the molten copper 3 bonds the intersecting parts adjacent in the radial direction of the tubular material to each other.

Thereafter, as a result of cooling, the molten copper solidifies whereupon, because each of the innumerable intersecting parts and the adjacent intersecting parts are firmly fixed by the copper, the shape retaining property of the filter as a whole is improved.

From the viewpoint of the normal actuation of the gas generator, the filter gas generator of the present invention is preferably one in which the overall pressure loss for an air flow quantity of 1 m$^3$/min is 0.02 to 500 kPa. The method of measurement of pressure loss employed in the present invention is based on the method disclosed in the paragraph no. 67 and FIG. 8 of JP-B No. 2926040.

The filter for a gas generator of the present invention can be employed in any gas generator for an air bag as long as the generator comprises a housing having a gas discharge port, an ignition means, a combustion chamber storing a gas generating agent and a filter for filtering and cooling a combustion gas. For example, the filter of the present invention can be employed in the gas generators disclosed in FIG. 1 of JP-A 10-1811516, FIG. 1 of JP-A 2001-97175 and FIG. 1 of WO-A 00/48868.

EXAMPLES

Example 1

Molding Step

The tubular material shown in FIG. 1 having the inner diameter of 61 mm, the outer diameter of 72 mm, the height of 57 mm and the mass of 170 g was obtained by knitting (hosiery knitting) a copper-plated iron wire (having the cross-sectional area of 0.2 mm$^2$ and the copper layer thickness of approximately 2 µm) on the perimeter of a cylindrical core material having the diameter of 60 mm.

Heat Processing Step

The tubular material obtained in the molding step was placed in a heating furnace and, after being kept therein for 10 minutes at 1180° C., the material was left as it is in a state of suspended heating and allowed to cool to room temperature, thereby producing a filter.

In the observation of the external appearance of the produced filter, it was confirmed that copper had affixed to the intersecting parts of the iron wires. The pressure loss of the filter was 0.25 kPa. Operational tests were conducted on a gas generator accommodating this filter (gas generator in FIG. 1 of JP-A 10-181516. 40 g of the gas generating agent comprising ammonium bi-tetrazole salt/basic copper nitrate/cellulose acetate (22.7 mass %/74.3 mass %/3 mass %) was used) and then, the device after activation was disassembled whereupon it was confirmed by an eye check that no slack or displacement of the filter had occurred.

The invention claimed is:

1. A filter for a gas generator, comprising:
    a single metal wire comprising a core wire of iron and a coating layer of copper, the coating layer of copper being molten and plated on the core wire,
    the single metal wire being wound into a tubular shape having intersecting parts of the single metal wire, wherein
    thickness of the coating layer on the core is from 0.5 μm to 10 μm, and
    at each of the intersecting parts of the single metal wire, adjacent parts of the core are firmly fixed each other via the coating layer, wherein
    the thickness of the coating layer at the intersecting parts is thicker than the remaining portion of the single metal wire, and
    the adjacent parts of the core are firmly fixed each other by melting all of the coating layer of copper and infiltrating the molten copper into gaps of the intersecting parts, so that the molten copper adheres to the surface of the intersecting parts, wherein the melting is performed at a temperature below the sintering temperature for the core wire of iron.

2. A gas generator for an air bag, comprising a housing having a gas discharge port, an ignition means actuated by an impact, a combustion chamber storing a gas generating agent that is ignited and burned by the ignition means to generate a combustion gas, and a filter for filtering and cooling a combustion gas, wherein the filter for a gas generator according to claim 1 is used as a filter.

3. The filter for a gas generator according to claim 1, wherein the tubular shape is obtained by winding the single metal wire on a perimeter of a cylindrical core material.

4. A method of making a filter for a gas generator, comprising:
    winding a single metal wire being into a tubular shape having intersecting parts of the single metal wire, wherein
    the single metal wire comprises a core wire of iron and a coating layer of copper, the coating layer of copper being molten and plated on the core wire,
    a thickness of the coating layer on the core is from 0.5 μm to 10 μm, wherein
    adjacent parts of the core are firmly fixed to each other by melting all of the coating layer of copper and infiltrating the molten copper into gaps of the intersecting parts, so that the molten copper adheres to the surface of the intersecting parts, wherein the melting is performed at a temperature below the sintering temperature for the iron core, and wherein the filer is formed so that
    at each of the intersecting parts of the single metal wire, adjacent parts of the core are firmly fixed each other via the coating layer, wherein
    the thickness of the coating layer at the intersecting parts is thicker than the remaining portion of the single metal wire.

5. The method of manufacturing the filter for a gas generator according to claim 4, wherein the filter has an inner diameter of 3 to 80 mm, an outer diameter of 10 to 90 mm, a height of 5 to 300 mm and a mass of 10 to 400 g.

6. The method of manufacturing the filter for a gas generator according to claim 5 or 4, wherein, the melting is performed at a temperature 10° C. or more higher than a melting point of the copper coating, but at a temperature 10° C. or more lower than a melting point of the iron core wire, wherein the melting is performed at a temperature below the sintering temperature for the iron core.

* * * * *